United States Patent
Pyun et al.

(10) Patent No.: US 10,323,667 B2
(45) Date of Patent: Jun. 18, 2019

(54) COMPOSITE PRODUCT WITH JUNCTION STRUCTURE

(71) Applicant: HYUNDAI MOTOR COMPANY, Seoul (KR)

(72) Inventors: Sung Don Pyun, Suwon-si (KR); Chang Dong Kim, Suwon-si (KR); Moon Seop Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/221,345

(22) Filed: Jul. 27, 2016

(65) Prior Publication Data

US 2017/0268549 A1 Sep. 21, 2017

(30) Foreign Application Priority Data

Mar. 15, 2016 (KR) .......................... 10-2016-0030715

(51) Int. Cl.
*F16B 5/08* (2006.01)
*B29C 65/00* (2006.01)

(52) U.S. Cl.
CPC ................ *F16B 5/08* (2013.01); *B29C 66/00* (2013.01); *Y10T 403/471* (2015.01); *Y10T 403/472* (2015.01); *Y10T 403/477* (2015.01); *Y10T 403/478* (2015.01)

(58) Field of Classification Search
CPC ............. Y10T 403/471; Y10T 403/472; Y10T 403/477; Y10T 403/478; F16B 5/08
USPC .................................. 403/266, 267, 270, 271
See application file for complete search history.

(56) References Cited

U.S. PATENT DOCUMENTS

| | | | | | |
|---|---|---|---|---|---|
| 4,120,998 A | * | 10/1978 | Olez | .......................... | B64C 1/26 |
| | | | | | 156/169 |
| 4,725,507 A | * | 2/1988 | Lescaut | .................... | B23K 9/23 |
| | | | | | 220/4.12 |
| 5,358,929 A | * | 10/1994 | Fujikami | ................. | H01F 6/065 |
| | | | | | 228/179.1 |

(Continued)

FOREIGN PATENT DOCUMENTS

| JP | 2004-155157 A | 6/2004 |
|---|---|---|
| JP | 2011-073191 A | 4/2011 |

(Continued)

OTHER PUBLICATIONS

Korean Office Action dated Apr. 17, 2017, issued in Korean Patent Application No. 10-2016-0030715.

*Primary Examiner* — Josh Skroupa
*Assistant Examiner* — Cory B Siegert
(74) *Attorney, Agent, or Firm* — Morgan, Lewis & Bockius LLP

(57) ABSTRACT

A composite product having a junction structure includes a first unit formed of a composite material, a first connector formed of a metal and provided with one end inserted into one end of the first unit and formed integrally with the first unit and another end extending outwards from the first unit, a second unit formed of a composite material, and a second connector formed of a metal and provided with one end inserted into one end of the second unit and formed integrally with the second unit and another end extending outwards from the second unit, wherein the other end of the first connector and the other end of the second connector are joined and fixed by welding under a condition that the ends of the first unit and the second unit are opposite each other adjacently.

10 Claims, 8 Drawing Sheets

(56) References Cited

U.S. PATENT DOCUMENTS

| | | | | |
|---|---|---|---|---|
| 5,476,704 | A * | 12/1995 | Kohler | B29C 66/721 244/119 |
| 5,862,975 | A * | 1/1999 | Childress | B23K 31/02 228/120 |
| 5,992,117 | A * | 11/1999 | Schmidt | B62D 33/046 296/186.1 |
| 6,060,682 | A * | 5/2000 | Westbroek | B23K 26/24 219/105 |
| 6,374,570 | B1 * | 4/2002 | McKague, Jr. | B29C 65/56 52/156 |
| 6,582,539 | B2 * | 6/2003 | Iwanczyk | B23K 33/00 156/73.5 |
| 6,718,713 | B2 * | 4/2004 | McKague, Jr. | B29C 65/56 52/309.13 |
| 7,244,487 | B2 * | 7/2007 | Brantley | B29C 65/561 244/123.7 |
| 7,611,595 | B2 * | 11/2009 | Barnes | B23K 35/02 156/148 |
| 7,790,294 | B2 * | 9/2010 | Macguire | B23K 1/0008 428/293.1 |
| 8,272,618 | B2 * | 9/2012 | Kilwin | F16B 11/006 248/346.01 |
| 9,302,349 | B2 * | 4/2016 | Peca | B23K 26/22 |
| 2013/0129409 | A1 * | 5/2013 | Cho | B29C 65/4835 403/266 |
| 2016/0053788 | A1 * | 2/2016 | Iwano | B29C 65/70 403/268 |

FOREIGN PATENT DOCUMENTS

| | | |
|---|---|---|
| JP | 2013-255934 A | 12/2013 |
| JP | 2015-024436 A | 2/2015 |
| KR | 10-2010-0026124 A | 3/2010 |
| KR | 10-2013-0096232 A | 8/2013 |
| KR | 10-2014-0075485 A | 6/2014 |
| KR | 10-2016-0023580 A | 3/2016 |
| WO | 2012/024023 A1 | 2/2012 |

* cited by examiner

COMPOSITE PRODUCT WITH JUNCTION STRUCTURE

CROSS-REFERENCE TO RELATED APPLICATION

This application claims the benefit of priority to Korean Patent Application No. 10-2016-0030715, filed on Mar. 15, 2016 with the Korean Intellectual Property Office, the disclosure of which is incorporated herein by reference.

TECHNICAL FIELD

The present disclosure relates to a composite product with a junction structure, and more particularly to a composite product with a junction structure which improves productivity and increases bonding strength in an assembly of units formed of composite materials.

BACKGROUND

In recently launched high-performance vehicles, parts formed of a lightweight material, i.e., Carbon Fiber Reinforced Plastic (CFRP), instead of conventional parts formed of steel are applied to a vehicle frame so as to achieve lightweight vehicles.

As necessary technologies, hetero-junction or composite junction technology is being developed, but junction technologies relate to a lap junction structure using an adhesive or a mechanical bonding structure with rivets, bolt/nut insert hardware, etc.

In a case of a lap junction structure using an adhesive, a layout is restricted due to an increase in thickness of an overlap region between two parts or an increase of the overlap region is required to increase bonding strength. In a case of a mechanical bonding structure, a weak spot, such as a fastener hole, may be formed.

Further, since both the lap junction structure and the mechanical bonding structure cannot be produced together with conventional parts formed of steel, an exclusive line may need to be installed and operated, and thus manufacturing costs are increased.

The above description has been provided to aid in understanding of the background of the present disclosure and should not be interpreted as corresponding to conventional technology known to those skilled in the art.

SUMMARY

Therefore, the present disclosure has been made in view of the above problems, and it is an object of the present disclosure to provide a composite product with a junction structure which may improve productivity and increase bonding strength in assembly of units formed of composite materials.

In accordance with the present disclosure, the above and other objects can be accomplished by the provision of a composite product having a junction structure, including a first unit formed of a composite material, a first connector formed of a metal and provided with one end inserted into one end of the first unit and formed integrally with the first unit and another, or the other, end extending outwards from the first unit, a second unit formed of a composite material, and a second connector formed of a metal and provided with one end inserted into one end of the second unit and formed integrally with the second unit and another, or the other, end extending outwards from the second unit, wherein the other end of the first connector and the other end of the second connector are joined and fixed by welding under a condition that the ends of the first unit and the second unit are opposite each other adjacently.

A first protrusion may be formed at the one end, or the end, of the first unit, the first connector may include a first attachment part having a shape corresponding to the first protrusion and being in surface contact with the first protrusion so as to form an attachment surface with the first protrusion and a first connection part extending outwards from the first attachment part, a second protrusion may be formed at the one end, or the end, of the second unit, and the second connector may include a second attachment part having a shape corresponding to the second protrusion and being in surface contact with the second protrusion so as to form an attachment surface with the second protrusion and a second connection part extending outwards from the second attachment part so as to form a connection surface contacting the first connection part.

The first connection part and the second connection part may extend in a direction horizontal to, or with, the first protrusion and the second protrusion, the lower surface of the first connection part and the upper surface of the second connection part may form connection surfaces contacting each other, and welding may be carried out at the connection surfaces.

A height formed by the first connector and the second connector in a contact state may be the same as the thickness of the first unit and the second unit, and the first unit, the first connector, the second connector and the second unit may form one flat surface.

The first protrusion may be placed on the first attachment part so that the first attachment part may support the first protrusion, the first connection part may be placed on the second connection part so that the second connection part may support the first connection part, and the second attachment part may be placed on the second protrusion so that the second protrusion may support the second attachment part.

The first connection part and the second connection part may be connected so as to form a gap therebetween.

The first connection part and the second connection part may extend in a direction vertical to the first protrusion and the second protrusion, the front surface of the first connection part and the front surface of the second connection part may form connection surfaces contacting each other, and welding may be carried out at the connection surfaces.

Insertion grooves may be formed on the first attachment part and the second attachment part so that the first protrusion and the second protrusion are inserted into the insertion grooves so as to form attachment surfaces.

The first connection part and the second connection part may extend in a direction horizontal to, or with, the first protrusion and the second protrusion, the lower surface of the first connection part and the upper surface of the second connection part may form connection surfaces contacting each other, and welding may be carried out at the connection surfaces.

The first connection part and the second connection part may have the same thickness as that of the first attachment part and the second attachment part and extend in a direction horizontal to, or with, the first protrusion and the second protrusion, the front surface of the first connection part and the front surface of the second connection part may form connection surfaces contacting each other, and welding may be carried out at the connection surfaces.

A plurality of first connectors may be attached to both ends of the first unit and a plurality of second connectors may be attached to both ends of the second unit so that the first unit, the first connectors, the second unit and the second connectors form a closed section through junction between the first connectors and the second connectors.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
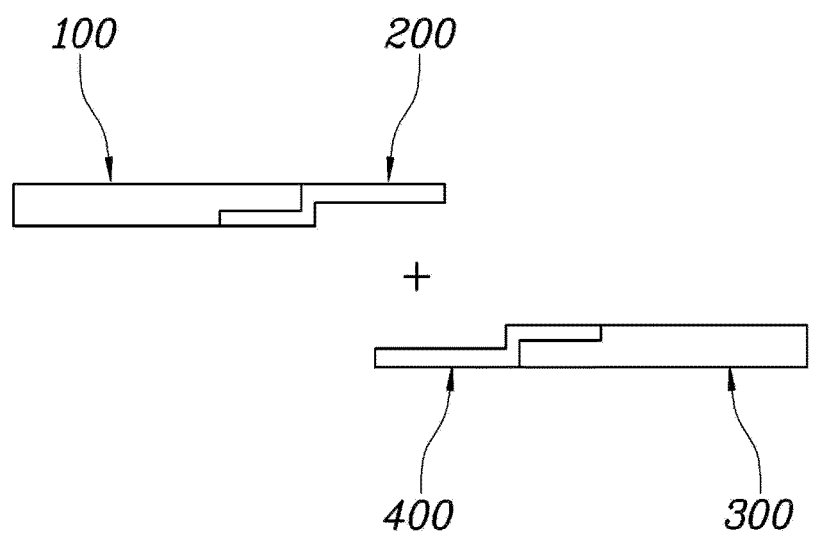
FIG. 1 is a view illustrating a first unit, a first connector, a second unit and a second connector in accordance with one embodiment of the present disclosure.
Figure 2:
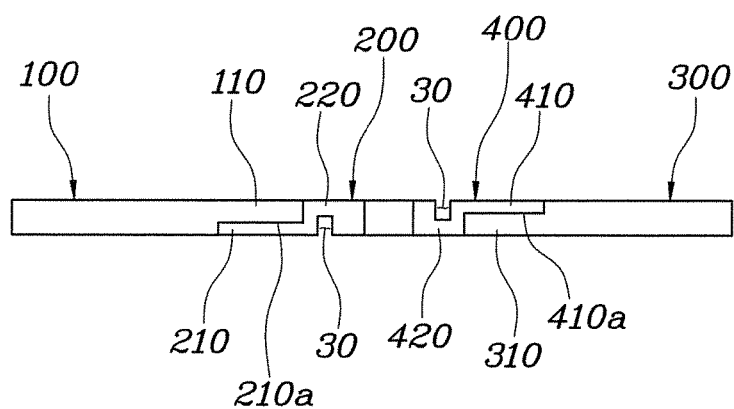
FIG. 2 is a view illustrating a composite product with a junction structure in accordance with one embodiment of the present disclosure.

A composite product with a junction structure in accordance with one embodiment of the present disclosure, as exemplarily shown in FIGS. 1 and 2, may include a first unit 100 formed of a composite material, a first connector 200 formed of a metal and provided with one end inserted into one end of the first unit 100 and formed integrally with the first unit 100 and another end extending outwards from the first unit 100, a second unit 300 formed of a composite material, and a second connector 400 formed of a metal and provided with one end inserted into one end of the second unit 300 and formed integrally with the second unit 300 and another end extending outwards from the second unit 300, and the other end of the first connector 200 and the other end of the second connector 400 may be joined and fixed by welding under the condition that the ends of the first unit 100 and the second unit 300 are opposite each other adjacently.

In more detail, a first protrusion 110 may be formed at an end of the first unit 100, the first connector 200 may include a first attachment part 210 having a shape corresponding to the first protrusion 110 and being in surface contact with the first protrusion 110 so as to form an attachment surface 10 with the first protrusion 110 and a first connection part 220 extending outwards from the first attachment part 210, a second protrusion 310 may be formed at an end of the second unit 300, and the second connector 400 may include a second attachment part 410 having a shape corresponding to the second protrusion 310 and being in surface contact with the second protrusion 310 so as to form an attachment surface 10 with the second protrusion 310 and a second connection part 420 extending outwards from the second attachment part 410 so as to form a connection surface 20 contacting the first connection part 220. Insertion grooves 210a and 410a are formed on the first attachment part 210 and the second attachment part 410, respectively, so that the first protrusion 110 and the second protrusion 310 are inserted into the insertion grooves 210a and 410a, respectively, so as to form attachment surfaces.

The first unit 100 may form a part through assembly with another unit. The first unit 100 may be formed of a composite material and the composite material may include a resin and reinforced fiber impregnated with the resin. A thermoplastic resin or a thermosetting resin may be used as the resin. Carbon fiber, glass fiber or aramid fiber may be used as the reinforced fiber and, preferably, carbon fiber may be used to form a part having excellent mechanical properties. However, the disclosure is not limited thereto.

The first protrusion 110 may be formed at an end of the first unit 100. The first connector 200 may be attached to the first protrusion 110, and the first attachment part 210 of the first connector 200 may have a shape corresponding to a shape of the first protrusion 110 of the first unit 100 so that the first unit 100 and the first connector 200 form attachment surfaces 10 in surface contact with each other.

If the first protrusion 110 protrudes from the end of the first unit 100 at a right angle so as to have a stepped shape, at least two vertical surfaces and one horizontal surface of each of the first protrusion 110 and the first attachment unit 210 may form the attachment surface 10 and, thus, the stable connection state between the first unit 100 and the first connector 200 may be maintained.

Figure 3:
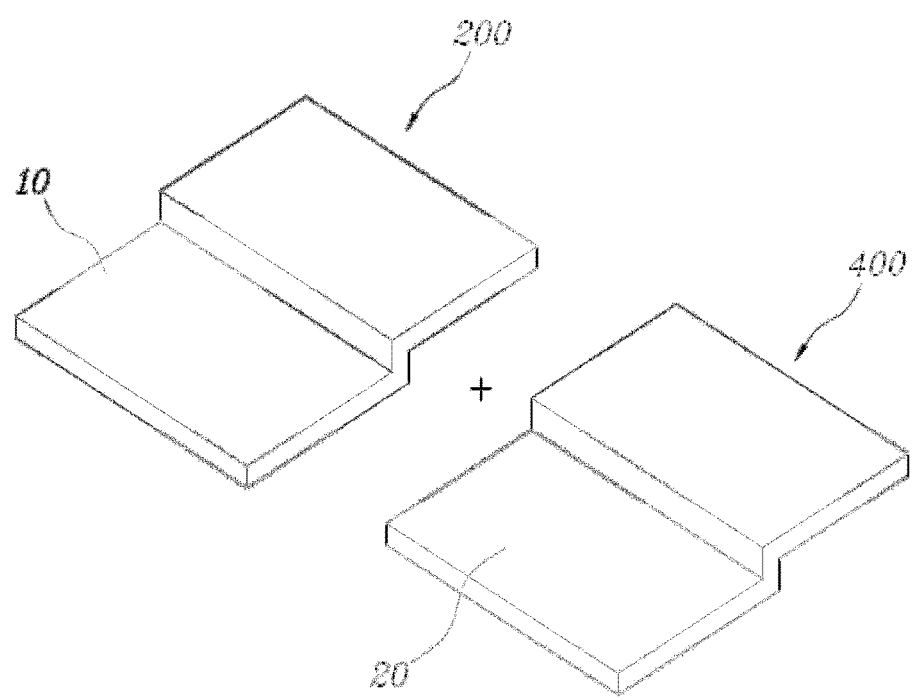
FIG. 3 is a view illustrating a first connector and a second connector in accordance with one embodiment of the present disclosure.

As exemplarily shown in FIG. 3, the first connection part 220 may extend outwards from the first attachment part 210 for the sake of connection with another connector. Since the first connector 200 may be formed of a metal, such as steel or aluminum, the first connector 200 may be joined with another connector by welding a region of the first connection part 220 connected to the other connector.

Here, an outward extension of the first connection part 220 may mean an extension of the first connection part 220 from the first attachment part 210 in a horizontal direction, in a vertical direction or in a diagonal direction.

Figure 4:
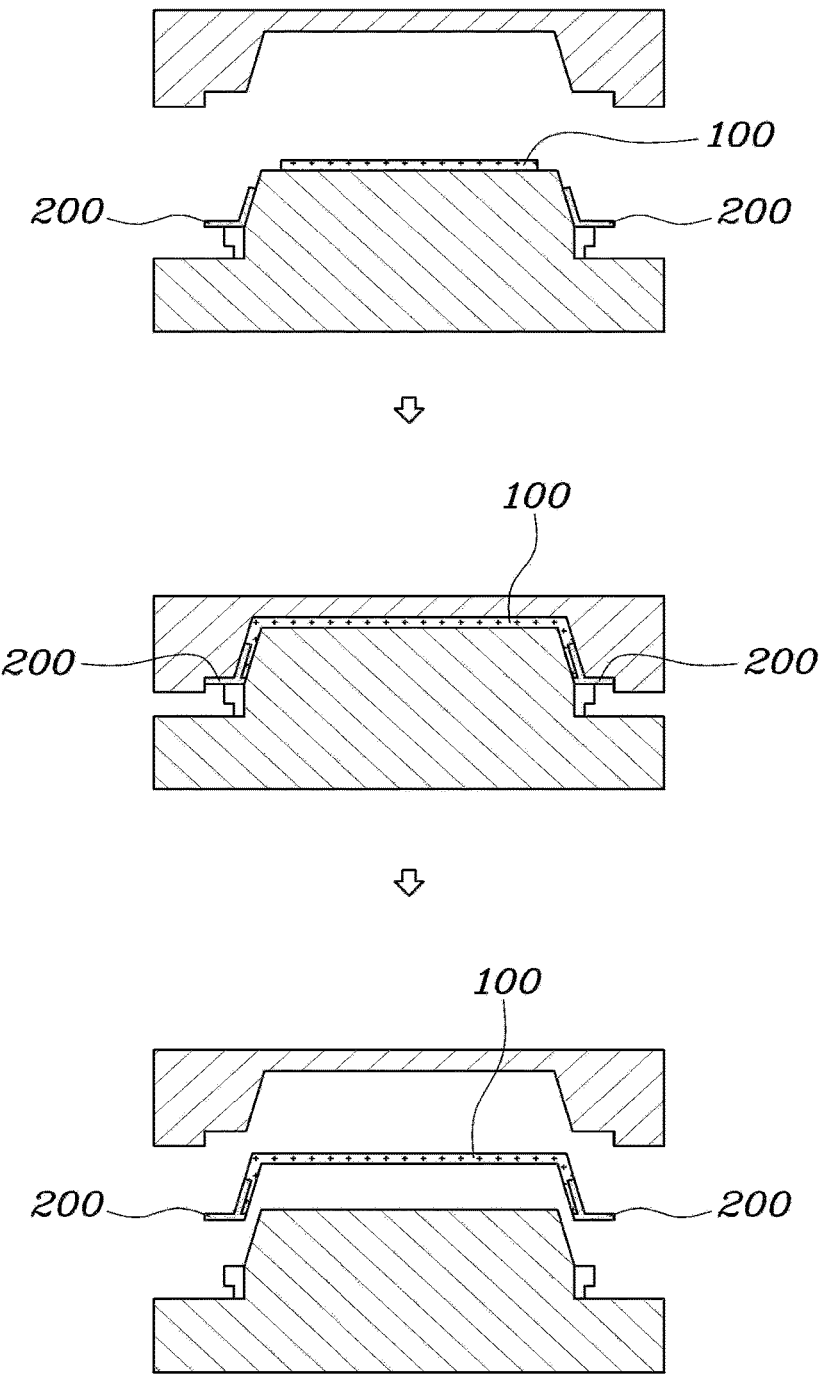
FIG. 4 is a view illustrating a bonding process between a first unit and a first connector in accordance with one embodiment of the present disclosure.

The first unit 100 and the first connector 200 may be separately provided and may be attached and fixed to each other through an adhesive applied to the attachment surfaces 10. Further, as exemplarily shown in FIG. 4, when press molding using Prepreg Compression Molding (PCM) or injection molding using Resin Transfer Molding (RTM) is carried out, the first connector 200 may be molded integrally with the first unit 100.

The second unit 300 may form a part through assembly with the first unit 100. In the same manner as the first unit 100, the second unit 300 may be formed of a composite material including a resin and reinforced fiber impregnated with the resin. A thermoplastic resin or a thermosetting resin may be used as the resin. Carbon fiber, glass fiber or aramid fiber may be used as the reinforced fiber and, preferably, carbon fiber may be used to form a part having excellent mechanical properties. However, the disclosure is not limited thereto.

The second protrusion 310 may protrude from an end of the second unit 300, and the second attachment part 410 of the second connector 400 may be connected to the second protrusion 310. The second attachment part 410 may have a shape corresponding to the shape of the second protrusion 310 of the second unit 300 so that the second unit 300 and the second connector 400 may form attachment surfaces 10 in surface contact with each other.

The second connection part 420 of the second connector 400 may be formed of a metal, such as steel or aluminum, and extend outwards from the second attachment part 410 for the sake of connection with the first connector 200, as exemplarily shown in FIG. 3. The second connection part 420 and the first connection part 220 may form connection surfaces 20 in contact with each other and may be joined by carrying out welding at the connection surfaces 20.

Here, spot welding or $CO_2$ welding may be performed according to the bonding structure between the first connector 200 and the second connector 400.

A butt junction structure may be formed through welding between the first connector 200 and the second connector 400 formed of metal and, thereby, an assembly property between parts may be improved. Further, differently from a conventional method, it may not be necessary to provide a separate hole on parts, there is no possibility that the thickness of an overlap region between the parts is increased and, thus, a degree of freedom of a layout configuration and an A/S ability may be increased.

Further, a conventional steel-based assembly line may be used in common and, if a vehicle frame is formed of a heterogeneous material, the vehicle frame may be welded to conventional steel parts.

In the composite product with a junction structure in accordance with an embodiment of the present disclosure, as exemplarily shown in FIG. 2, the first connection part 220 and the second connection part 420 may extend in a direction horizontal with, or to, the first protrusion 110 and the second protrusion 310, the lower surface of the first connection part 220 and the upper surface of the second connection part 420 may form connection surfaces 20 contacting each other, and welding may be carried out at the connection surfaces 20.

A height formed by the first connector 200 and the second connector 400 in the contact state may be the same as the thickness of the first unit 100 and the second unit 300 and, thus, the first unit 100, the first connector 200, the second connector 400 and the second unit 300 may form one flat surface.

The outward extension direction of the first connection part 220 and the second connection part 420 may be horizontal with the first protrusion 110 and the second protrusion 310 and spot welding may be carried out at the connection surfaces 20, thereby bonding the first unit 100 and the second unit 300. Here, the height formed by the first connector 200 and the second connector 400 may be the same as the thickness of the first unit 100 and the second unit 300 and, thus, the first unit 100, the first connector 200, the second connector 400 and the second unit 300 may form one flat surface, thereby preventing an increase in thickness of the overlap region.

Differently from a conventional connection using rivets or bolts/nuts, in which a mechanical connection part is present, the present disclosure forms a part with one flat surface and thus increases a degree of freedom in design.

Further, the first protrusion 110 may be placed on the first attachment part 210 so that the first attachment part 210 may support the first protrusion 110, the first connection part 220 may be placed on the second connection part 420 so that the second connection part 420 may support the first connection part 220, and the second attachment part 410 may be placed on the second protrusion 310 so that the second protrusion 310 may support the second attachment part 410.

If the first unit 100, the first connector 200, the second connector 400 and the second unit 300 are formed to have structures engaged with one another so as to support counterpart protruding ends thereof, they may withstand a load applied from the outside, and thus durability of the product may be improved.

The first connection part 220 and the second connection part 420 may be connected so as to form a gap 30 therebetween. As exemplarily shown in FIG. 2, if the first connection part 220 and the second connection part 420 are not completely directly connected but are connected so as to form the gap 30 therebetween, it may be possible to prevent the first connector 200 and the second connector 400 formed of metal from expanding due to heat and thus being structurally defective when welding is carried out at the connection surfaces 20.

Further, the bonding distance between the first unit 100 and the second unit 300 may be adjusted by adjusting the overlap region between the first connection part 220 and the second connection part 420.

Figure 5:
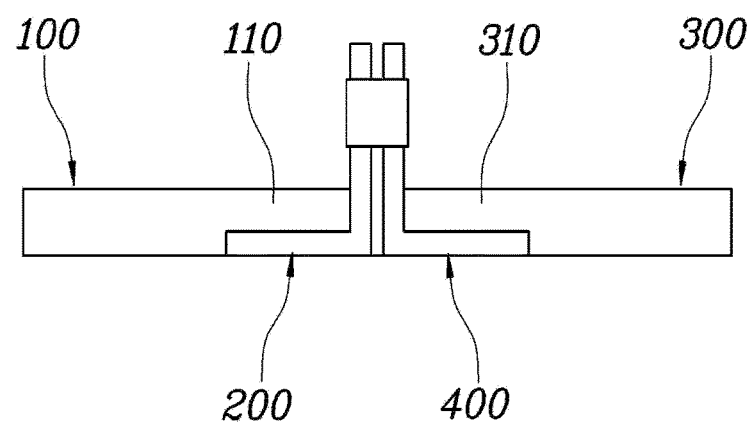
FIG. 5 is a view illustrating a composite product with a junction structure in accordance with an embodiment of the present disclosure.

In a composite product having a junction structure in accordance with a further embodiment of the present disclosure, as exemplarily shown in FIG. 5, a first connection part 220 and a second connection part 420 may extend in a direction vertical to a first protrusion 110 and a second protrusion 310, the front surface of the first connection part 220 and the front surface of the second connection part 420 may form connection surfaces 20 contacting each other, and welding may be carried out at the connection surfaces 20.

The outward extension direction of the first connection part 220 and the second connection part 420 may be vertical to the first protrusion 110 and the second protrusion 310 and spot welding may be carried out at the connection surfaces 20, thereby bonding the first unit 100 and the second unit 300. Accordingly, the bonding distance between the first unit 100 and the second unit 300 may be minimized and preparation for a difficulty in executing spot welding according to shape of the product may be made.

Figure 6:
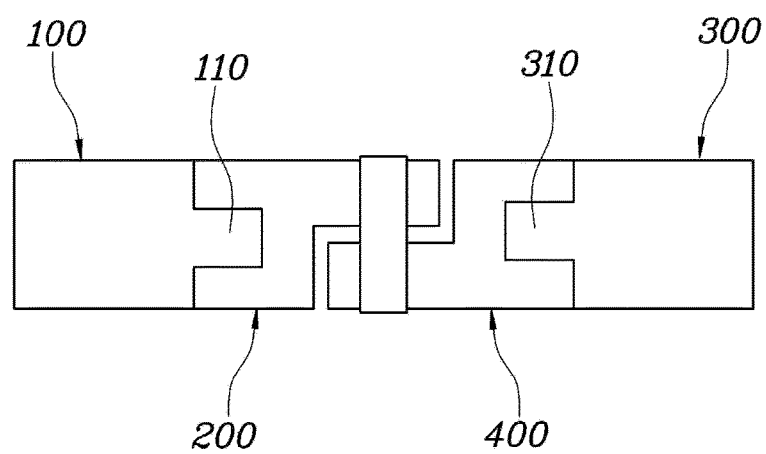
FIG. 6 is a view illustrating a composite product with a junction structure in accordance with an embodiment of the present disclosure.
Figure 7:
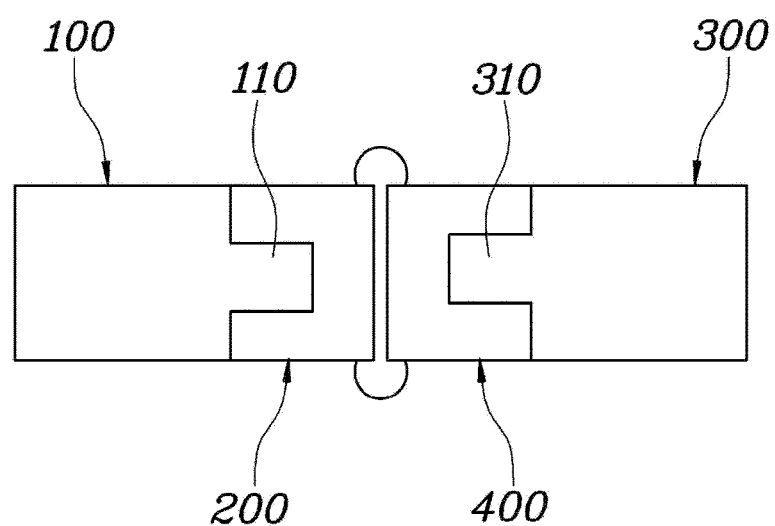
FIG. 7 is a view illustrating a composite product with a junction structure in accordance with an embodiment of the present disclosure.

In a composite product having a junction structure in accordance with another embodiment of the present disclosure, as exemplarily shown in FIG. 6, a first attachment part 210 and a second attachment part 410 may have attachment surfaces 10 surrounding the upper and lower surfaces of a first protrusion 110 and a second protrusion 310.

If a first unit 100 and a second unit 300 have a large thickness and thus a first connector 200 and a second connector 400 attached to ends of the first and second units 100 and 300 have a large thickness, in order to maintain a stable connection state between the first and second units 100 and 300 and the first and second connectors 200 and 400, the first attachment part 210 and the second attachment part 410 may form the attachment surfaces 10 having a shape surrounding the upper and lower surfaces of the first protrusion 110 and the second protrusion 310.

If the first protrusion 110 and the second protrusion 310 protrude at a right angle, at least three vertical surfaces and two horizontal surfaces of each of the first protrusion 110 and the first attachment unit 210 and each of the first attachment part 210 and the second attachment part 410 form the attachment surfaces 10 and. Thus, the stable connection state therebetween may be maintained.

The first connection part 220 and the second connection part 420 may extend in a direction horizontal with, or to, the first protrusion 110 and the second protrusion 310 and the lower surface of the first connection part 220 and the upper surface of the second connection part 420 may form connection surfaces 20 contacting each other, and welding may be carried out at the connection surfaces 20. Further, a height formed by the first connector 200 and the second connector 400 in a contact state may be the same as the thickness of the first unit 100 and the second unit 300.

Spot welding may be carried out at the connection surfaces 20 of the first connection part 220 and the second connection part 420, thereby bonding the first unit 100 and the second unit 300. Here, the height formed by the first connector 200 and the second connector 400 may be the same as the thickness of the first unit 100 and the second unit 300 so as to prevent an increase in thickness of the overlap region, and the bonding distance between the first unit 100 and the second unit 300 may be adjusted by adjusting the overlap region between the first connection part 220 and the second connection part 420.

Otherwise, the first connection part 220 and the second connection part 420 may have the same thickness as that of the first attachment part 210 and the second attachment part 410 and extend in a direction horizontal with, or to, the first protrusion 110 and the second protrusion 310, the front surface of the first connection part 220 and the front surface of the second connection part 420 may form connection surfaces 20 contacting each other, and welding may be carried out at the connection surfaces 20.

The bonding distance between the first unit 100 and the second unit 300 may be adjusted by adjusting the extending distance of the first connection part 220 and the second connection part 420, and $CO_2$ welding may be carried out to bond the first unit 100 and the second unit 300 in preparation for a difficulty in executing spot welding according to a shape of the product.

Figure 8:
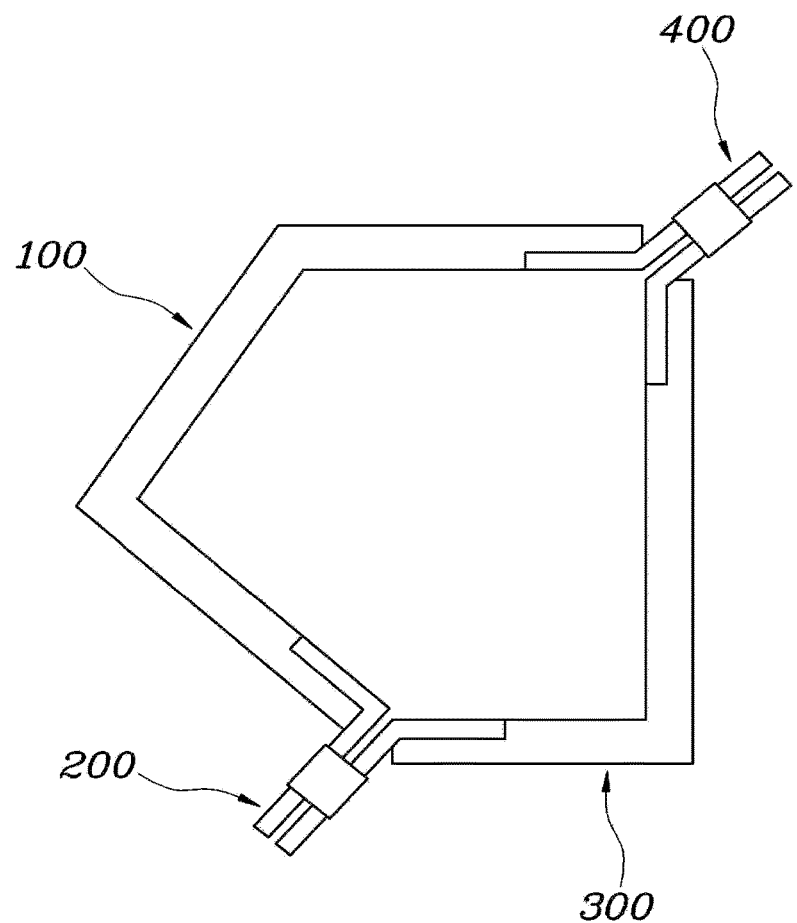
FIG. 8 is a view illustrating a structure in which a closed section is formed by a first unit, a first connector, a second unit and a second connector in accordance with another embodiment of the present disclosure.

Another embodiment of the present disclosure, as exemplarily shown in FIG. 8, may provide a junction structure in which a plurality of first connectors 200 is attached to both ends of a first unit 100, a plurality of second connectors 400 is attached to both ends of a second unit 300, and a closed section is formed by the first unit 100, the first connectors 200, the second unit 300 and the second connectors 400 through a junction between the first connectors 200 and the second connectors 400.

The first connectors 200 and the second connectors 400 may be respectively attached to both ends of the first unit 100 and the second unit 300 and welding may be carried out at connection surfaces 20 formed by the first connectors 200 and the second connectors 400, thereby being capable of bonding the first unit 100 and the second unit 300.

As is apparent from the above description, a composite product with a junction structure may improve productivity and increase bonding strength in assembly of units formed of composite materials. Further, a butt junction structure is achieved and, thus, an assembly property and a degree of freedom of layout with parts matching with or attached to vehicle frame parts may be increased.

Moreover, a conventional steel-based assembly line may be used in common and, if a vehicle frame is formed of a heterogeneous material, the vehicle frame may be welded to conventional steel parts.

Although embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A composite product having a junction structure, comprising:
    a first unit formed of a composite material;
    a first connector formed of a metal and provided with one end inserted into one end of the first unit and formed integrally with the first unit and another end extending outwards from the first unit;
    a second unit formed of a composite material; and
    a second connector formed of a metal and provided with one end inserted into one end of the second unit and formed integrally with the second unit and another end extending outwards from the second unit,
    wherein the another end of the first connector and the another end of the second connector are joined and fixed by welding under a condition that the ends of the first unit and the second unit are opposite each other adjacently,
    a first protrusion is formed at the one end of the first unit,
    the first connector includes a first attachment part having a structure configured to be engaged with the first protrusion and being in surface contact with the first protrusion so as to form an attachment surface with the first protrusion and a first connection part extending outwards from the first attachment part,
    a second protrusion is formed at the one end of the second unit,
    the second connector includes a second attachment part having a structure configured to be engaged with the second protrusion and being in surface contact with the second protrusion so as to form another attachment surface with the second protrusion and a second connection part extending outwards from the second attachment part so as to form a connection surface contacting the first connection part,
    each of the first connection part and the second connection part has a groove, and
    wherein insertion grooves are formed on the first attachment part and the second attachment part so that each of the first protrusion and the second protrusion is inserted into the insertion grooves so as to form the attachment surface.

2. The composite product according to claim 1, wherein the first connection part and the second connection part extend in a direction horizontal to the first protrusion and the second protrusion, and a lower surface of the first connection part and an upper surface of the second connection part form connection surfaces contacting each other, and
    the connection surfaces of the first connection part and the second connection part include a welding.

3. The composite product according to claim 1, wherein the first protrusion is placed on the first attachment part so that the first attachment part supports the first protrusion, the first connection part is placed on the second connection part so that the second connection part supports the first connection part, and the second attachment part is placed on the second protrusion so that the second protrusion supports the second attachment part.

4. The composite product according to claim 1, wherein the first connection part and the second connection part are connected so as to form a gap therebetween.

5. The composite product according to claim 1, wherein:
the first connection part and the second connection part extend in a direction vertical to the first protrusion and the second protrusion, and a front surface of the first connection part and a front surface of the second connection part form connection surfaces contacting each other; and
the connection surfaces of the first connection part and the second connection part include a welding.

6. The composite product according to claim 1, wherein:
the connection surfaces of the first connection part and the second connection part include a welding.

7. The composite product according to claim 1, wherein:
the first connection part and the second connection part have a thickness in a vertical direction the same as a thickness of the first attachment part and the second attachment part in the vertical direction, and extend in a direction horizontal to the first protrusion and the second protrusion;
a front surface of the first connection part and a front surface of the second connection part form connection surfaces contacting each other; and
the connection surfaces of the first connection part and the second connection part include a welding.

8. The composite product according to claim 1, wherein:
a plurality of first connectors is attached to both ends of the first unit; and
a plurality of second connectors is attached to both ends of the second unit so that the first unit, the first connectors, the second unit and the second connectors form a closed section through junction between the first connectors and the second connectors.

9. The composite product according to claim 1, wherein a height from an upper surface of the first connector to a lower surface of the second connector in a contact state of the first connector and the second connector is the same as a thickness from an upper surface to a lower surface of the first unit and the second unit, so that the first unit, the first connector, the second connector and the second unit form one flat surface.

10. The composite product according to claim 1, wherein the groove of the first connection part is spaced apart from the first protrusion, and the groove of the second connection part is spaced apart from the second protrusion.

* * * * *